March 13, 1956 W. J. FLEMING 2,738,446
PANELBOARD CONSTRUCTION
Filed March 4, 1952 2 Sheets-Sheet 1
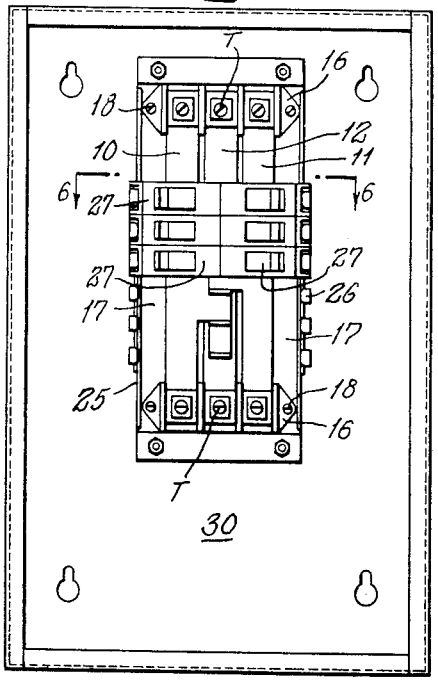
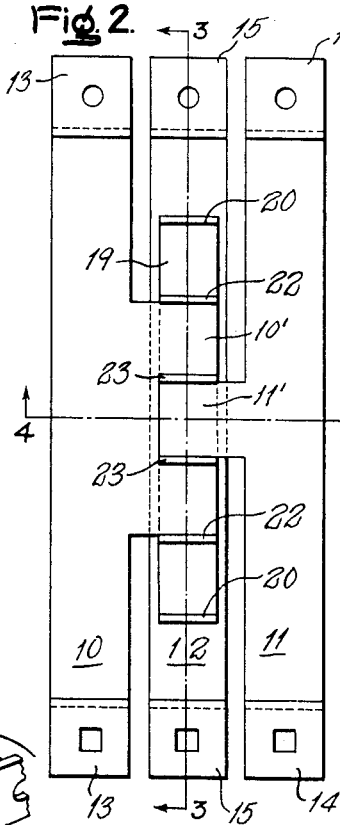
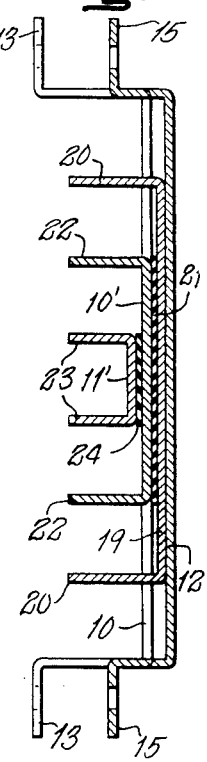
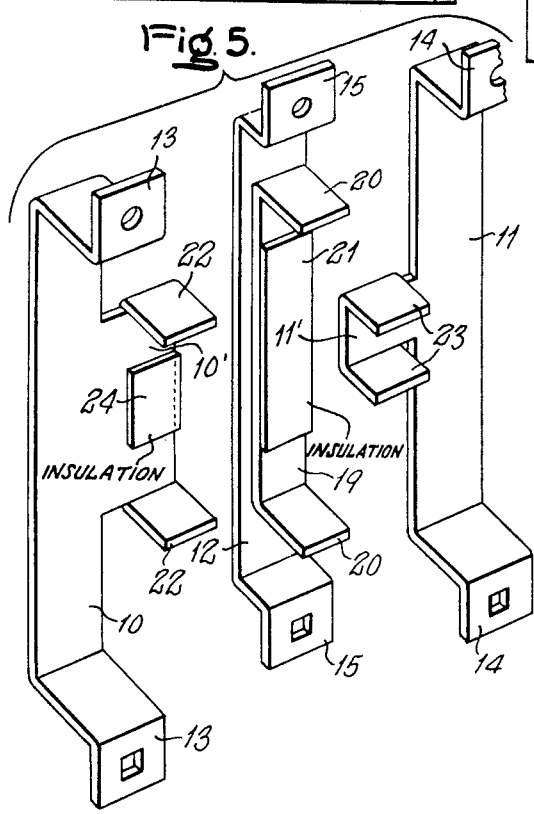
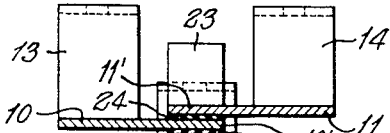
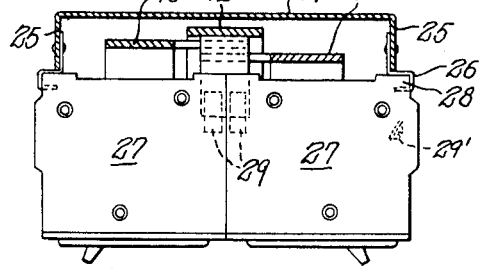
Inventor:
William J. Fleming,
by R. S. Allyn
His Attorney.

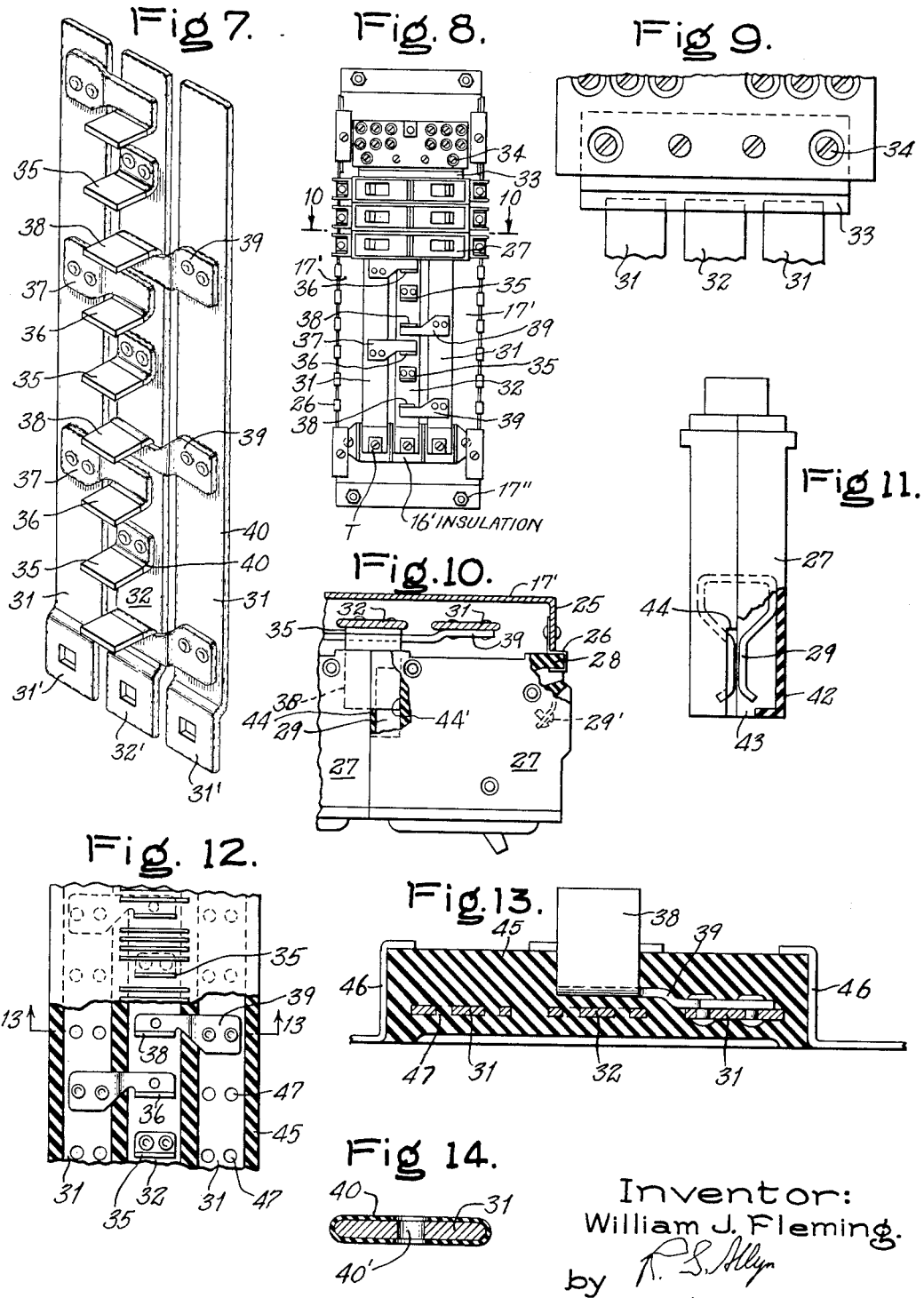

United States Patent Office 2,738,446
Patented Mar. 13, 1956

2,738,446
PANELBOARD CONSTRUCTION

William J. Fleming, Wauwatosa, Wis., assignor to General Electric Company, a corporation of New York Application March 4, 1952, Serial No. 274,749

20 Claims. (Cl. 317—119)

My invention relates to electric panelboards, load centers, and the like for use in electric lighting and power distribution systems, and more particularly to the mounting of bus bars and circuit breakers on panelboards and the like.

This application is a continuation-in-part of my copending application Serial Number 184,759, filed September 14, 1950, for Panelboard Construction. This application also includes subject matter described and claimed in application Serial Number 184,753, filed September 14, 1950, by Herman J. Hammerly, assigned to the present assignee, and now abandoned.

Conventional panelboards comprise a suitable enclosure or cabinet in which is supported a plurality of supply bus bars in substantially parallel relation and a plurality of circuit breakers arranged in one or more rows and connected electrically to the bus bars by cross extending electrically conducting straps. The circuit breakers are secured in the panelboard by means of screws or bolts and the electric connections between the circuit breakers and the connecting straps likewise are made by means of screws. These steps in the assembly of the panelboard are obviously time consuming and require the use of tools.

Accordingly an object of my invention is a more compact assembly of the bus bars and electric connections together with a more compact assembly of the circuit breakers themselves, and the use of circuit breakers of smaller over-all size, whereby a substantial reduction in the size and cost of the panelboard is effected.

A still further object of my invention is the provision of readily detachable mounting means for the circuit breakers including electric circuit connection means of the plug-in type for the circuit breakers whereby the circuit breakers can be mounted quickly on and removed from the panelboard without the use of tools, the electric connections between the circuit breakers and the bus bars being made during the mounting operation.

In carrying out my invention in one form, I mount the bus bars in a tray in closely spaced relation and arrange the circuit breakers in pairs with the circuit breakers of each pair extending in substantially abutting end-to-end relation crosswise of the bus bars and tray. The two circuit breakers of each pair are electrically connected to a single one of the bus bars.

For the electric connection of each pair of circuit breakers to one of the bus bars and also for the support of the abutting inner ends of the circuit breakers of each pair I provide a flat plug contact blade which extends transversely edgewise with respect to the bus bar and which is engaged by two spring terminal connectors mounted respectively on the inner abutting ends of the two circuit breakers. The contact blades for the group of bus bars are arranged to extend outward at right angles to the bus bars in flatwise alignment with each other in a column or row extending parallel with and centrally of the bus bars and tray. They are electrically connected in a predetermined order to the respective bus bars by rigid electrically conducting and supporting members, each blade being connected to a single bus bar, whereby the blades are supported by the bus bars. Each bus bar and the blade supporting members connected to it may be provided with a coating of electrically insulating material.

The support for the outer end of each circuit breaker comprise cooperating readily detachable mechanical connecting means on the outer end of the circuit breaker housing and the adjacent side of the tray, respectively. This connecting means for the outer end of the circuit breaker is arranged to be engaged when the circuit breaker is held with its inner end tilted outwardly away from its contact blade after which the breaker is swung about its outer end as a pivot to a mounted position in which its terminal connector engages substantially one-half of the contact blade, the other half of the blade being engaged by the terminal connector of the abutting companion circuit breaker of the pair. It will thus be evident that the circuit breakers can be assembled very quickly on the tray, the electric connections to the bus bars being made at the same time. Contrawise a circuit breaker can be readily detached.

Fig. 1 is a front view of a panelboard embodying one form of my invention located in a conventional wall box or cabinet with several circuit breakers in place.

Fig. 2 is a front view of the bus bars and their contact blades on a larger scale.

Fig. 3 is a longitudinal sectional view on the plane of the line 3—3 of Fig. 2.

Fig. 4 is a cross sectional view on the plane of line 4—4 of Fig. 2.

Fig. 5 is an exploded perspective view of the bus bars of Figs. 1 to 4.

Fig. 6 is a cross sectional view of the panel support on the plane of the line 6—6 of Fig. 1 and showing a pair of circuit breakers mounted in end-to-end relation.

Fig. 7 is a perspective view showing a modified construction of bus bars and contact blades embodying my invention.

Fig. 8 is a front view on a smaller scale showing such bus bars mounted in a tray for installation in a suitable housing or cabinet.

Fig. 9 is an enlarged fragmentary view showing the support of Fig. 8 for the upper ends of the bus bars.

Fig. 10 is a view partly in section on the plane of the line 10—10 of Fig. 8.

Fig. 11 is an end view of the circuit breaker, parts being broken away.

Fig. 12 is a fragmentary view partly in section showing a modification of the mounting of the bus bars.

Fig. 13 is an enlarged transverse sectional view, the section being taken on the plane of the line 13—13 of Fig. 12.

Fig. 14 is an enlarged sectional view of a perforated bus bar showing a coating of insulating material.

In the construction shown in Figs. 1 to 6 of the drawing two bus bars 10 and 11 are mounted parallel to each other and between these side bus bars is located a central parallel bar 12. The bus bars are provided with offset terminal extensions on each end such as 13, 14 and 15. Each bus bar is supported at each end by a transverse insulating block 16 to which the extensions 13, 14 and 15 are secured and the blocks are supported in the tray 17 by means of screws 18 with the bus bar 12 extending centrally of the tray. The bus bars are provided with suitable line wiring terminals T at either or both ends.

The central bus bar 12 carries an electrically conducting bar 19 which is bent at the ends to form contact blades 20, 20 extending crosswise of the bus bar and at right angles to the plane of the bus bar which blades are adapted to receive and support plug-in circuit breakers. The bus bar 10 has an integral extension 10′ which overlies the insulating piece 21 on the central bar. The contact blades 22, 22 project from the extension 10′ and when the bus bars are assembled extend parallel to the contact blades 20, 20. The bus bar 11 has an extension 11′ which is insulated from the extension 10′ by an insulating member 24. The contact blades 23, 23 are bent upwardly from the extension 11' in line with and parallel to blades 20 and 22. It will be observed that the bar 19 and bus bar extensions 10' and 11' form rigid electrically conducting supporting members for supporting the contact blades on the bus bars.

As shown in the drawing the blades 20, 22 and 23 extend edgewise in transverse relation with the bus bars and are arranged in flatwise alignment in a single column or row opposite the central bus bar 12 and extending centrally of the tray 17. The tray 17 has side walls or flanges 25, 25 provided on their edges with spaced hook-like members 26, constituting detachable pivotal circuit breaker supporting means, there being a hook member 26 opposite each edge of each blade.

As shown in Fig. 6, the manually operated circuit breakers 27, 27 are mounted in pairs with the circuit breakers of each pair extending in end-to-end abutting relation crosswise of the bus bars. Each breaker is provided on its outer lower end corner with a lug 28 formed on the insulating housing of the circuit breaker, which lug detachably interlocks with a hook member 26 whereby the outer ends of the circuit breakers are hingedly supported on the side walls of the tray 17. On their opposite abutting inner ends the circuit breakers are provided each with a plug connector terminal 29 in the form of spring jaws which grasp and frictionally engage substantially one-half portions of the contact blade positioned between the two hooks 26. Certain aspects of the circuit breaker construction shown are described and claimed in copending application Serial Number 542,748, filed October 25, 1955, which application is a division of the present application.

It will be observed that each contact blade thus constitutes a pair of plug contact means and serves as an electric connection between its two circuit breakers and one of the bus bars, as well as a support for the inner adjacent ends of the two circuit breakers. This arrangement of a single electric contact and supporting blade for each pair of circuit breakers provides for a very compact and low cost assembly of the circuit breakers and bus bars and tray with the bus bars in closely spaced relation whereby circuit breakers of smaller size can be used. The circuit breakers are provided with a mechanism (not shown) of any suitable type and having a plug terminal 29 at one end, one suitable form of breaker mechanism being disclosed in the Getchell Patent 2,455,753.

In mounting a circuit breaker on the supporting tray the circuit breaker is held in a tilted position, i. e. with the inner end tilted downward as viewed in Fig. 10 in spaced relation with the contact blade, and the lug 28 is inserted in the hook 26, a sufficiently loose fit being provided so that the lug slips freely into the hook with the circuit breaker held in this position. The circuit breaker is then swung in the plane of its cooperating contact blade and about the hook 26 as a pivot from the tilted position to the final position shown in Fig. 6, its contact jaws 29 being forced onto the blade. It will be observed that the two hooks 26 mounting the outer ends of a pair of circuit breakers are spaced apart a distance just sufficient to accommodate two circuit breakers, the contact blade being midway between the hooks, and therefore substantially abutting engagement of the two inner ends of the circuit breakers is assured.

As shown in Fig. 1, adjacent contact blades are spaced apart a distance approximately equal to the width of a circuit breaker so that the circuit breakers are mounted in compact substantially side-by-side engagement. The assembly of the tray, bus bars and circuit breakers is preferably mounted by screws 17" in a suitable type of box or cabinet 30 having a suitable front or trim plate (not shown) which still further secures the circuit breakers in place and a door (not shown) if desired. Any breaker unit may be easily mounted or removed independently of all others.

The pivotal mounting of the outer ends of the circuit breakers greatly facilitate the separate removal of a single circuit breaker from a solid row of circuit breakers because such a breaker cannot be grasped at its sides or ends to pull it straight out, but it can easily be pivoted from between the adjacent circuit breakers by grasping the handle and the outer end. After it has been disengaged from the contact blade, it is freely removable.

In the form shown in Figs. 7 to 10 inclusive and 14, the bus bars 31, 31, 32 are arranged in a substantially common plane and supported at their ends, the upper ends of the bus bars being supported in an insulating block 33 which is provided with a groove into which the ends of the bus bars extend and which is secured in the tray 17' by one or more screws or bolts 34. The offset terminal lower ends 31', 31', 32' of the bus bars are supported on a transverse insulating block 16' which is secured in the tray 17', such as previously described. The tray is provided with lateral hook-like members 26, each of which engages a lug 28 on a manually operated circuit breaker 27, as shown in Fig. 10. Each bus bar is provided with a circuit terminal T.

In this case, the center bus bar 32 is provided with contact blades 35, 35 whose feet are riveted or welded to the bus bar 32 whereby the blades are supported by the bus bar. One bus bar 31 is provided with a number of contact blades 36, 36 which are provided with rigid electrically conducting transverse supporting extensions 37, 37 which are riveted or welded to the bus bar 31 and so constructed that the base of each blade is spaced away from the center bus bar 32. Similarly the other bus bar 31 is provided with projecting contact blades 38, 38 mounted on transverse supporting extensions 39, 39. The base of each of these blades 38, 38 is spaced away from the center bus bar 32.

Each bus bar 31, 31, and 32 and its blade supporting feet or transverse blade supporting members, as the case may be, is provided with an insulating coating 40 as shown in Fig. 7 and the enlarged sectional view Fig. 14. This coating is preferably made of a vinyl resin or plastisol material. It may be applied by immersing each bus bar while heated to about 150° C. in the liquid material for a few seconds and then removing it, a thin layer of partially solidified material adhering to the bus bar. The bus bar is then heated in an oven to a temperature of about 150° C. for a period such as one hour, sufficiently to solidify the coating. Thicker layers may be produced by repeated dipping and baking. This coating may be removed at the end of the bus bar where the hole 40' is formed to receive the line terminal (in Fig. 14).

As shown in Fig. 8, the bus bars are mounted in the tray in closely spaced relation with the contact blades in a column or row extending centrally of the tray, the contact blades being in flatwise alignment with each other and extending edgewise in transverse relation with the bus bars.

The circuit breakers 27 in the form shown in Figs. 7 to 11 inclusive are mounted on the tray in the same manner as disclosed in Figs. 1 to 6 inclusive. In other words, the circuit breaker is first held in a tilted position with respect to the tray and its lug 28 inserted in the selected hook 26 and then the opposite end of the circuit breaker, provided with the plug contact jaws 29, is swung about the hook 26 as a pivot into engagement with the opposite contact blade and then forced onto the contact blade with the jaws frictionally grasping the blade. As shown in Figs. 10 and 11 the plug contact jaws 29, forming one terminal of the circuit breaker, are mounted inside of the insulating housing 42 of the circuit breaker and the housing is provided with a slot 43 in its lower wall and inner or front wall, i. e. in a lower inner end corner, as viewed in Fig. 11 to receive substantially one-half of the contact blade, the contact jaws being positioned in the slot. As shown in Fig. 10 the circuit breaker is pressed onto the contact blade until the end of the blade engages the upper edge or wall 44 of the slot.

Moreover, the endwise position of the circuit breaker is determined and adjusted when necessary when the circuit breaker is being pressed onto the contact blade by engagement of the rearward wall 44' of the slot with the side edge of the contact blade adjacent the hook 26, so as to shift the circuit breaker endwise farther into the hook. This endwise positioning of the circuit breaker when necessary in case the lug has not been completely inserted in the hook assures that the circuit breaker will cover no more than one-half of the contact blade and consequently leave sufficient space for the other circuit breaker of the pair. It will be observed that because of the pivotal movement of the breaker, the jaws 29 are forced on the contact blade with a combined longitudinal and transverse movement with respect to the contact blade.

It will be observed that the final position of the circuit breaker is definitely fixed by the hook 26 at one end and by engagement of the housing with the blade at the other end. These limiting positions are such that the two circuit breakers of a pair as shown in Fig. 10 when in mounted position are in end-to-end alignment with their adjacent inner ends in substantially abutting engagement, since the two hooks on opposite sides of a contact blade are spaced apart, as shown in the drawing, a distance substantially equal to twice the length of a single circuit breaker with the contact blade midway between them.

Usually in a given panelboard construction, three bus bars are provided for connection respectively to the three conductors of a three-phase grounded neutral electric supply source and with at least two contact blades attached to each bus bar. One of the blades on one of the bus bars will be located near its terminal, such as lower blade 38 on the bus bar 31, the next successive blade 35 will be attached to the next bus bar 32, and the third successive blade 36 will be attached to the third bus bar 31. The second blade attached to the first bus bar will be spaced from the third blade, and so on in phase sequence as shown in Fig. 7.

In the form shown in Figs. 12 and 13 the bus bars are embedded in a resilient, solidified, molded insulating body 45 made of a vinyl resin or plastisol composition to form a rugged unitary assembly as described and claimed in a copending application Serial Number 273,473 filed February 26, 1952, by Herman J. Hammerly, Robert T. Casey, and Wilfred H. Yeamans, assigned to the same assignee as this application.

The bus bar and contact blade arrangement of Figs. 12 and 13 is the same as disclosed in Figs. 7 to 10 inclusive with the contact blades projecting from spaced points along the length of the body 45. It will be understood that the offset terminal ends 31', 31' and 32' of the bus bars will project from one end of the molded body 45. This molded unitary bus bar assembly is flat and preferably rectangular in shape, and is supported centrally in the tray by means of metal clamps 46 secured to the tray and engaging the molded body so that the molded body forms a support for the bus bars throughout their lengths while having sufficient resiliency to provide for expansion and contraction of the relatively rigid bus bars without damage to the molded body. Preferably the bus bars are provided with perforations 47 through which the insulating material while in liquid form flows during the molding process.

A preferred composition for the body 45 consists of vinyl chloride resin 36%, styrene polymer (Dow 276–V2) 27%, di octyl phthalate 18%, lead stearate 8%, calcium carbonate 10% and carbon black .5%.

In the molding operation the bus bars with the contact blades attached are secured to a support or fixture in the desired relative positions and lowered into the liquid composition contained in a metal mold, and then the mold with the immersed bus bars is placed in an oven and heated at a temperature of approximately 150° C. for a period of one hour to cause permanent solidification or fusing of the material. The assembly is then readily removed from the mold in view of the fact that the material of the body 45 does not adhere to the metal after solidification.

It will be understood that whereas I have disclosed a circuit breaker of the manually operated type provided with switch contacts which are separated to open the circuit in response to a pre-determined current, the term "circuit breaker" is defined to include other types of control units or circuit interrupters, such as switches, fuses and combinations of switches and fuses.

While I have described only certain preferred embodiments of the invention by way of illustration, many modifications will occur to those skilled in the art and I therefore wish to have it understood that I intend in the appended claims to cover all such modifications as fall within the true spirit and scope of the invention.

I claim:

1. The combination in a panelboard construction or the like, of a support, a plurality of bus bars mounted on said support in substantially parallel laterally spaced relation with each other, a plurality of circuit breaker plug contact blades, rigid electrically conducting members electrically connecting and mounting said blades each to one of said bus bars and supporting said blades to project outward from said bus bars in substantially edgewise transverse relation with the direction of the length of said bus bars and in substantially flatwise alignment with each other in a single row centrally of said support, pairs of circuit breakers having the circuit breakers of each pair extending in end to end abutting relation crosswise of said bus bars, and a pair of female contact terminals mounted respectively on the abutting ends of the circuit breakers of each pair, said breaker terminals frictionally engaging side-by-side portions of one of said contact blades thereby to connect electrically each said pair of circuit breakers to one of said contact blades and detachably secure the abutting ends of said circuit breakers to said blade.

2. The combination in a panelboard construction or the like, of a support, a plurality of bus bars mounted on said support in substantially parallel electrically insulated relation with each other, a plurality of circuit breaker plug contact blades electrically connected each to one of said bus bars so as to project outward from said bus bars in substantially edgewise transverse relation with said bus bars and in substantially flatwise alignment with each other in a row, a plurality of circuit breakers extending each transversely of said bus bars, a contact jaw on a first end of each of said circuit breakers frictionally engaging one of said contact blades thereby to connect electrically said circuit breakers each to one of said contact blades and detachably secure said first ends to said blades, and pivotal detachable connections between the opposite ends of said circuit breakers respectively and said support providing for separate pivotal movement of each of said circuit breakers in the mounting or removal thereof.

3. A bus bar and circuit breaker assembly for panelboards and the like, comprising a tray provided with sides, a plurality of bus bars mounted in said tray in substantially parallel electrically insulated relation with each other, a plurality of circuit breaker plug contact blades, electrically conducting members electrically connecting said blades each to one only of said bus bars and supporting said blades to project outward from said bus bars in substantially edgewise transverse relation with said bus bars and in substantially flatwise alignment with each other centrally of said tray, pairs of circuit breakers having the circuit breakers of each pair extending in end to end relation crosswise of said bus bars, contact jaws on the adjacent ends of said circuit breakers of each pair frictionally engaging side-by-side portions of a single one of said contact blades thereby to connect electrically said circuit breakers to said contact blade and detachably secure said adjacent ends to said blade, and pivotal detachable connections between the opposite ends of said circuit breakers of each pair respectively and opposite sides of said tray, said detachable connection between each circuit breaker and said tray being arranged to be interlocked when the adjacent end of the circuit breaker is tilted away from said tray after which said adjacent end is swung toward said tray to bring its contact jaws into engagement with said blade.

4. A panelboard construction comprising a shallow tray, three flat bus bars spaced laterally from each other in planes parallel to said tray, the central bus bar having blades extending outwardly therefrom in aligned spaced relation, one of said bus bars having an integral lateral extension extending over the central bus bar with integral blades on said extension extending outwardly therefrom in aligned spaced relation with the blades on the central bus bar, the other of said bus bars having an integral lateral extension extending over the central bus bar with blades on said extension extending outwardly therefrom in aligned spaced relation with the blades on the other two bus bars, all of said blades being disposed in a single column in nested relation along the central bus bar for receiving terminals of control units, means on the bus bars for connection to line terminals, means for insulating said lateral extensions from the central bus bar and from each other, and means on the tray opposite the contact blades for pivotally detachably securing electric control units thereto.

5. A panel construction comprising three parallel flat bus bars disposed in laterally spaced apart substantially coplanar relation, the central bus bar having an integral contact blade projecting outwardly therefrom and transversely perpendicular thereto, each of the side bus bars having an integral lateral extension overlying but insulated from the central bus bar, each extension having two spaced integral contact blades projecting therefrom in parallel flatwise aligned relation with the first-mentioned blade.

6. A panelboard or the like comprising a support, a plurality of elongated bus bars mounted in said support in parallel laterally spaced apart relation, a plurality of circuit breaker plug contact blades mounted in said support each transverse to the direction of said bus bars and in flatwise alignment with each other to form a row of blades parallel to the direction of said bars, said contact blades being electrically connected each to one of said bus bars, and detachable circuit breaker holding means mounted in said support in opposite spaced relation with the side edges of said contact blades, said holding means being constructed and arranged to pivotally interlock with one end of a circuit breaker in such manner that the circuit breaker may be swung about said holding means as a pivot toward or away from said opposite contact blade and in the plane thereof in the mounting or removal of the circuit breaker.

7. A panelboard or the like comprising a support, a plurality of bus bars mounted in said support in substantially parallel electrically insulated relation with each other, a plurality of circuit breaker plug contact blades having each a transverse length effective to engage with two pairs of contact jaws on the substantially abutting ends of two circuit breakers, electrically conducting members rigidly connecting said blades each to one only of said bus bars and supporting said blades so that said blades project at substantially right angles to said bus bars in substantially edgewise transverse relation with said bus bars in a row in flatwise alignment with each other, and detachable circuit breaker holding means mounted in said support opposite the two side edges of said contact blades and spaced apart in rows parallel to said row of blades and by a distance substantially equal to twice the length of a circuit breaker with said contact blades midway between them, said detachable holding means being arranged to engage and support the outer end of a circuit breaker and provide for movement of the circuit breaker in the plane of the cooperating contact blade in the mounting or removal of the breaker.

8. A panelboard or the like comprising a support, a plurality of bus bars mounted in said support, a plurality of circuit breaker plug contact blades mounted in said support in a row in flatwise alignment with each other and electrically connected each to one of said bus bars, a plurality of circuit breakers in said support extending in edgewise relation to said contact blades, each of said circuit breakers having an insulating housing provided with a slot in a first end corner adapted to receive at least a substantial portion of one of said contact blades, plug contact terminal jaws in the housing of each said circuit breaker mounted in said slot so as frictionally to engage a contact blade inserted in said slot thereby to form an electric connection and support for one end of said circuit breaker, pivotal circuit breaker holding means in said support in spaced relation with a side edge of each of said contact blades, and means on the outer end of each of said circuit breaker housings engaging said holding means for pivotally supporting said outer end and providing for swinging movement of said circuit breaker on said holding means separately in the mounting or removal of said circuit breaker.

9. A panelboard or the like comprising a support, a plurality of bus bars mounted in said support in substantially parallel electrically insulated relation with each other, a plurality of circuit breaker plug contact blades, electrically conducting members rigidly connecting said blades each to one only of said bus bars and supporting said blades on said bus bars so that said blades project at substantially right angles to said bus bars in substantially edgewise transverse relation with said bus bars in a row in flatwise alignment with each other, a plurality of circuit breakers extending crosswise of said bus bars, each of said circuit breakers having an insulating housing provided with a slot in a lower end corner adapted to receive at least a substantial portion of one of said contact blades, terminal contact jaws in the housing of each said circuit breaker mounted in said slot so as frictionally to engage a contact blade inserted in said slot thereby to form an electric connection and support for one end of said circuit breaker, hook-like circuit breaker holding means in said support in opposite spaced relation with side edges of said contact blades, cooperating means on the outer end of each of said circuit breaker housings engaging said hook-like means for pivotally supporting said outer end and providing for swinging movement of said circuit breaker about said hook-like means as a pivot to a final mounted position with the walls of said slot engaging the top and side edges of said contact blade whereby said contact jaws are forced on said blade with a combined longitudinal and transverse sliding movement.

10. A panelboard or the like comprising a support, a plurality of bus bars mounted in said support in substantially parallel electrically insulated relation with each other, a plurality of circuit breaker plug contact blades, electrically conducting members rigidly connecting said blades each to one only of said bus bars and supporting said blades on said bus bars so that said blades project at substantially right angles to said bus bars in substantially edgewise transverse relation with said bus bars in a row in flatwise alignment with each other, pairs of circuit breakers having the circuit breakers of each pair extending in inner end-to-end relation crosswise of said bus bars, each of said circuit breakers having an insulating housing provided with a slot in a lower inner end corner for receiving substantially one-half of one of said contact blades, terminal contact jaws in the housing of each said circuit breaker mounted in said slot and frictionally engaging said contact blade thereby to form an electric connection and support for the inner end of said circuit breaker, hook-like holding means in said support opposite the side edges of each of said contact blades, means on the outer end of each said circuit breaker housing one of said supporting means whereby said outer end is supported, said supporting means opposite each blade being spaced apart a distance substantially equal to twice the length of a circuit breaker with said contact blade midway between them so that said circuit breakers of each pair are positioned in end-to-end substantially abutting engagement with each other with the walls of said slots engaging the top and side edges of one of said contact blades.

11. A panelboard construction including a tray having hooks arranged in a row along a side edge, three substantially parallel flat bus bars mounted in said tray and disposed in laterally spaced apart substantially coplanar relation, flat blades disposed in flatwise alignment in a row parallel to said row of hooks with the plane of said blades transverse of the rows, said blades being connected each to one said bus bar, and a plurality of electrical control units pivotally mounted for movement in a plane parallel to said blades on said hooks and provided with contact jaws engaging said blades.

12. In a panel board construction for holding circuit breakers or the like, a support, a plurality of bus bars mounted on said support in laterally spaced substantially parallel planar relation with each other, a plurality of flat plug-in contact blades, and rigid electrically conducting members mechanically mounting and electrically connecting each blade to a respective one of said bus bars and supporting said blades to project in planes perpendicular to the planes of said bus bars in edgewise relation to the direction of the length of said bars and in substantially flatwise alignment with each other in a single row parallel to said direction of said bars.

13. The panelboard construction of claim 12 wherein said contact blades have a dimension in the direction transverse to the direction of the length of said bars sufficient to accommodate and support two side-by-side circuit breaker female contact terminals plugged onto said blades from the top thereof.

14. A panelboard construction comprising a support having two spaced parallel rows of individual detachable holding means forming aligned pairs of said holding means, three substantially parallel flat bus bars mounted on said support between said two rows of holding means in laterally spaced apart substantially coplanar relation, flat contact blades disposed in flatwise alignment in a row parallel to said rows of holding means with the planes of said blades perpendicular to the direction of said rows, said blades being connected each to one of said bus bars, and pairs of electric control units, each pair being mounted in the same plane on an aligned pair of said holding means and having respective female contact terminals engaging side-by-side portions of one of said contact blades.

15. In a panelboard construction for holding circuit breakers or the like, a plurality of bus bars disposed in laterally spaced apart parallel substantially coplanar relation with each other, a plurality of plug-in flat contact blades, rigid electrically conducting members mechanically mounting and electrically connecting each blade to a respective one of said bus bars and supporting said blades to project in edgewise transverse relation to the direction of the length of said bars and in flatwise alignment in a single row parallel to said direction of said bars, and an insulating body supporting said bus bars and insulating each bus bar and its connected blade from each other bus bar and its connected blade.

16. A panelboard construction comprising three parallel flat bus bars disposed in laterally spaced apart substantially coplanar relation the central bar having a flat contact blade connected thereto and projecting perpendicularly therefrom in a plane transverse to the direction of the length of said bars, each of the side bars having connected thereto a rigid electrically conducting member laterally extending therefrom to overlie the central bus bar and each said rigid member having a contact blade in parallel spaced flatwise alignment with the first-mentioned blade, and a molded insulating body at least partially surrounding said bus bars and extending between said central bus bar and said rigid members to provide insulation and support therefor.

17. A panelboard construction for holding electric control units comprising a tray, three parallel flat bus bars spaced laterally from each other in planes parallel to said tray, the central bus bar having at least one flat contact blade electrically and mechanically connected thereto and projecting transversely perpendicular therefrom, rigid electrically conducting members connected to each side bus bar and laterally extending over the central bus bar, each such rigid member having a flat contact blade projecting therefrom in spaced flatwise alignment with said first-mentioned blade to form a row of contact blades extending parallel to the direction of the length of said bus bars, means insulating said laterally extending members from said central bus bar and from each other, and unit retaining means on the tray in planar alignment with each blade and cooperating with each blade for releasably securing an electric control unit plugged onto said blade by movement of the unit in the plane of the blade.

18. A panelboard construction including a support having two spaced parallel rows of individual detachable holding means forming aligned pairs of said holding means, at least one bus bar mounted in said support between said two rows of holding means, flat contact blades connected to and supported on said bus bars in flatwise alignment in a row parallel to said rows of holding means with the planes of said blades perpendicular to the direction of said rows, and pairs of electric control units, each pair mounted in the same plane on an aligned pair of said holding means and having respective female contact terminals engaging side-by-side portions of one of said contact blades.

19. In a panelboard construction for holding circuit breakers or the like, three parallel flat bus bars disposed in laterally spaced apart planar relation, the central bar having a flat contact blade connected thereto and projecting outwardly therefrom in a plane transverse to the direction of the length of said bars, each of the side bars having connected thereto a laterally extending electrically conducting rigid member overlying but insulated from the central bar, and each said rigid member having a contact blade extending therefrom in parallel flatwise spaced alignment with the first-mentioned blade.

20. A panelboard construction for use in three-phase circuitry, comprising three parallel bus bars disposed and laterally spaced apart in substantially coplanar relation, a first flat contact blade connected to the central bar and projecting outwardly therefrom in a plane transverse to the direction of the length of said bars, a second flat contact blade in adjacent spaced parallel flatwise alignment with said first blade, a third flat contact blade in adjacent spaced parallel flatwise alignment with said second blade on the side thereof opposite to said first blade, rigid laterally extending electrically conducting members mechanically connecting said second and third blades to respective ones of said side bus bars, and means for insulating said rigid members from said central bus bar from each other.

References Cited in the file of this patent

UNITED STATES PATENTS

| Number | Name | Date |
|---|---|---|
| 1,203,582 | Chase | Nov. 7, 1916 |
| 1,785,463 | Strongson | Dec. 16, 1930 |
| 1,913,552 | Jackson | June 13, 1933 |
| 1,950,717 | Douglas | Mar. 13, 1934 |
| 2,007,174 | Benjamin | July 9, 1935 |
| 2,206,325 | Lomax | July 2, 1940 |
| 2,336,517 | Wade | Dec. 14, 1943 |
| 2,347,210 | Leonard | Aug. 29, 1944 |
| 2,455,753 | Getchell | Dec. 7, 1948 |
| 2,530,548 | Stanley | Nov. 21, 1950 |
| 2,599,695 | Christensen | June 10, 1952 |
| 2,632,039 | Hammerly | Mar. 17, 1953 |
| 2,647,225 | Cole | July 28, 1953 |
| 2,689,286 | Cole | Sept. 14, 1954 |